March 11, 1930. B. F. HUTCHES, JR 1,749,977
PARKING CLOCK
Filed Dec. 28, 1923   3 Sheets-Sheet 1

Inventor
Benjamin F. Hutches Jr.
By his Attorneys

March 11, 1930.　　　B. F. HUTCHES, JR　　　1,749,977
PARKING CLOCK
Filed Dec. 28, 1923　　　3 Sheets-Sheet 2

Inventor
Benjamin F. Hutches Jr.
By his Attorneys

March 11, 1930.   B. F. HUTCHES, JR   1,749,977
PARKING CLOCK
Filed Dec. 28, 1923    3 Sheets-Sheet 3
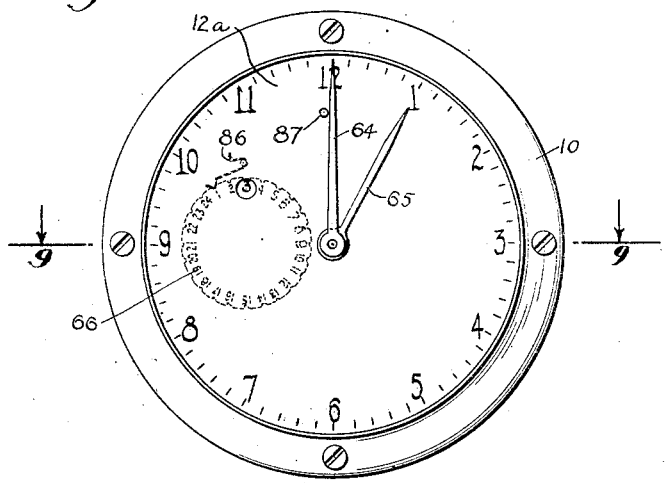
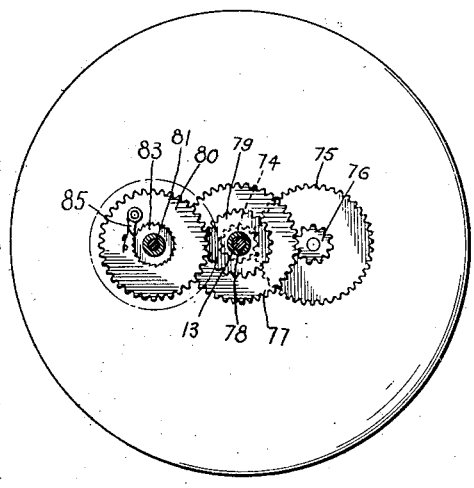
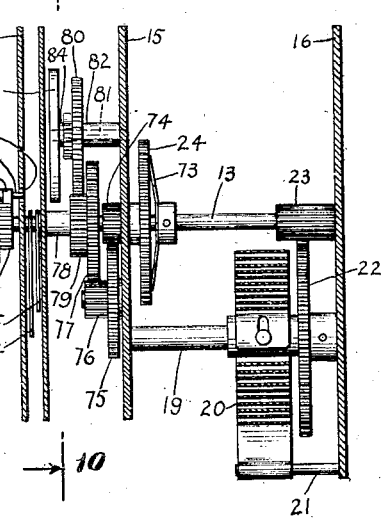
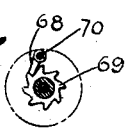

Patented Mar. 11, 1930

1,749,977

UNITED STATES PATENT OFFICE

BENJAMIN F. HUTCHES, JR., OF ALLENDALE, NEW JERSEY, ASSIGNOR TO HUTCHES ENGINEERING ASSOCIATION, INC., OF NEW YORK, N. Y., A CORPORATION OF NEW YORK

PARKING CLOCK

Application filed December 28, 1923. Serial No. 683,159.

This invention relates to a time indicator to show the elapsed time that a machine to which it is attached has been at rest, such for example, as vehicles, elevators, etc. The invention is described herein as used to indicate the time that an automobile has been parked, and accordingly I have termed the same a "parking clock", but it is to be understood that the elapsed time indicator, according to this invention, is equally applicable in any situation where time is to be recorded commencing when any machine or other device upon which the indicator is installed has ceased to have motion or has ceased operation.

So far as I am aware there is, at the present time, no satisfactory device or means for indicating the time that an automobile has been parked. It is therefore one of the objects of my invention to provide such a device which may be used not only to record or indicate the elapsed time for each particular stop made by the automobile, but also to record or indicate the total time that the car has stopped during a given period. To that end the indicator not only comprises a specific type of clock mechanism having an indicating means playing over a dial but also an accumulator actuated by said clock mechanism.

The advantages, features of construction and operation, and the further objects of the invention will more fully appear below taken in connection with the accompanying drawings, in which Fig. 1 is a front view of one embodiment of the parking clock.

Figure 7:
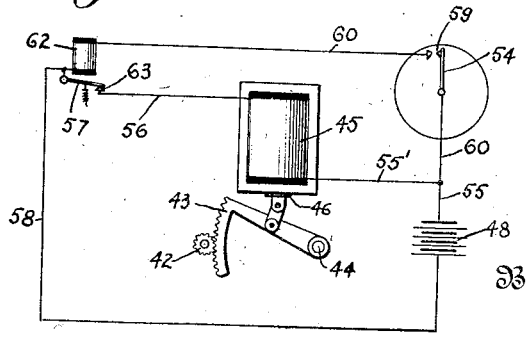

Fig. 7 indicates another wiring diagram by which the elapsed time indicating means is held at a zero position through suitable means operated by a centrifugal or other forces whereby a circuit is maintained so long as the vehicle is moving but automatically breaking the main winding circuit and allowing the device to record the time of parking when the vehicle is at rest.

Fig. 8 illustrates a modified form of the invention.

Fig. 9 is a longitudinal section on the line 9—9 in Fig. 8.

Fig. 10 is a section taken on the line 10—10 of Fig. 9.

Fig. 11 illustrates a detail.

Referring to the drawings in detail and first to the form of the invention illustrated in Figs. 1 to 6 inclusive, the reference numeral 10 (see Fig. 1) designates the casing of the parking clock, 11 the elapsed time indicating hand, 12 the accumulating hand, and 12ª the dial. The minute or indicating hand 11 is rigidly mounted upon the shaft 13 while the accumulating hand 12 is fastened to a sleeve 14 (see Fig. 4) surrounding the shaft 13.

The clock mechanism is supported by the front and back plates 15 and 16 which are rigidly secured one to the other by means of suitable bolts 17 and spacing sleeves 18. The driving shaft 13 and the arbor 19 are suitably journaled in the plates 15 and 16.

One end of a power spring 20 is secured to the arbor 19 while the other end thereof is secured to a stud or finger 21 secured to the plate 16, the arrangement being such that the spring normally tends to rotate the gear 22, fixed to the arbor, in a counter-clockwise direction. This gear 22 meshes with a pinion 23 on the shaft 13 to rotate said pinion together with the shaft in a clockwise direction. The pinion 23 is preferably located adjacent to one end of the shaft 13 and rotatably mounted upon the other end thereof is a gear wheel 24, which is caused to rotate with the shaft by a member 25 frictionally held against the same by means of the spring 26 encircling said shaft 13, it being clear from Fig. 4 that one end of the spring engages with the abutment 27 so as to impel the friction member 25 against the gear 24. The gear 24 meshes with a train of gears connected to escapement mechanism about to be briefly described.

The gear 24 (see Fig. 5) meshes with a pinion 28 fixed to but rotatable concentrically with a gear 29. The gear 29 in turn meshes with a pinion 30 fixed to but rotatable concentrically with a gear 31. The latter in turn meshes with a pinion 32 fixed to and rotatable with the escapement gear 33. The escapement gear or pinion 33 is connected in the usual way, not shown, with the escapement 34.

As before stated the minute or indicating hand 11 is fixed to and therefore actuated by the shaft 13. The accumulating hand 12, which may correspond to the hour hand of the ordinary clock, is driven by a train of gears which comprise the following. Rigidly mounted upon the shaft 13 exterior of the plate 15 is a pinion 35 which meshes with a gear 36 located upon a stub shaft 37 projecting outwardly from the plate 15. Loosely mounted on the shaft 37 and concentric with the gear 36 and actuated thereby is a pinion 38 which meshes with a gear 39 which operates the accumulating hand. The sleeve 14 of the latter is suitably connected to the gear 39 to be positively driven thereby. Mounted upon the gear 36 is a pawl 40 normally engaging with the pinion 38 and serves to lock the latter against retrograde movement whenever the minute or indicating hand is moved back to its zero position. The pinion 38 is frictionally mounted upon a sleeve 41 projecting from but secured to the gear 36. This enables the rotation of the pinion 35 and gear 36, the pawl riding over the pinion 38 when the minute hand is returned to its zero position.

Upon the rear end of the arbor 19 (see Figs. 3 and 4) is a pinion 42 in engagement with a rack 43 which moves about the point 44 as a center. When the vehicle is moving the position of the rack 43 relative to the pinion 42 is as indicated in Fig. 7.

Figure 1:
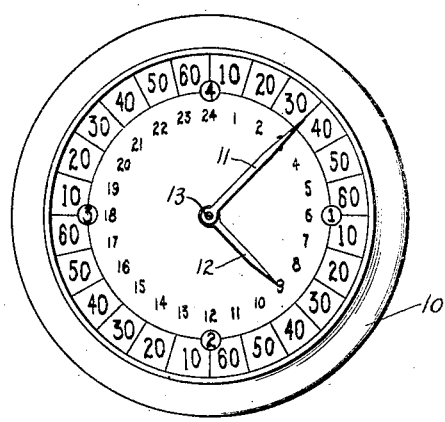
Figure 2:
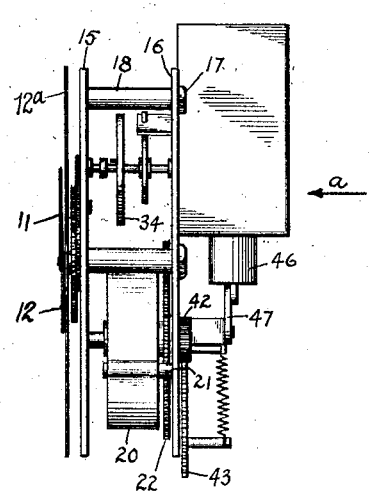
Fig. 2 is a perspective side view of the clock with the casing or housing removed but with the dial in position thereon.
Figure 3:
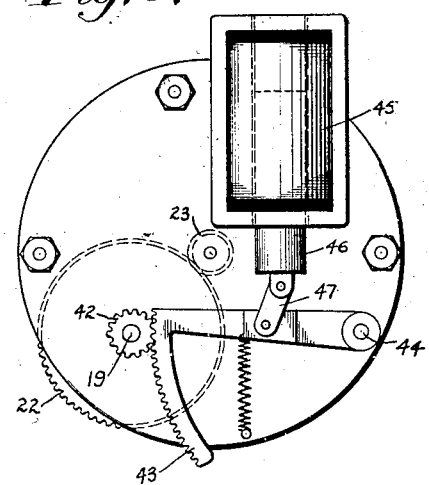
Fig. 3 is a rear view of the clock mechanism looking in the direction of the arrow $a$ of Fig. 2.
Figure 4:
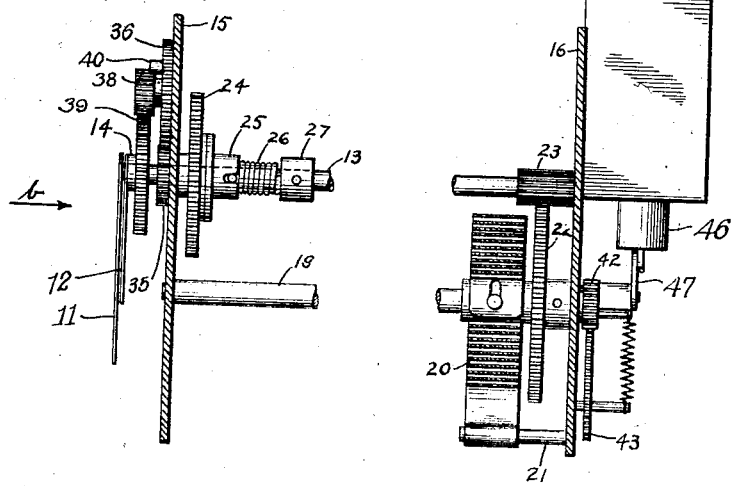
Fig. 4 is an enlarged sectional view of Fig. 2 illustrating certain parts of the clock mechanism.
Figure 5:
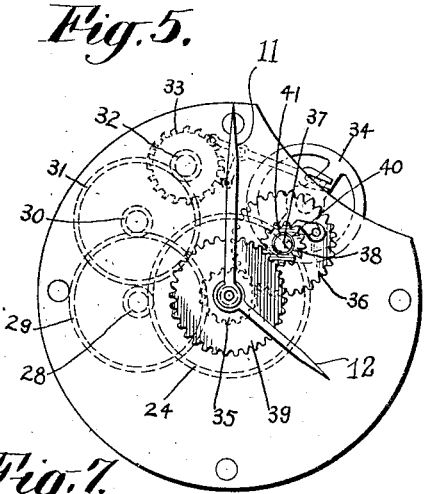
Fig. 5 is a view of the device looking in the direction of the arrow $b$ of Fig. 4 illustrating the gear train employed for operating the hour and accumulating hands.
Figure 6:
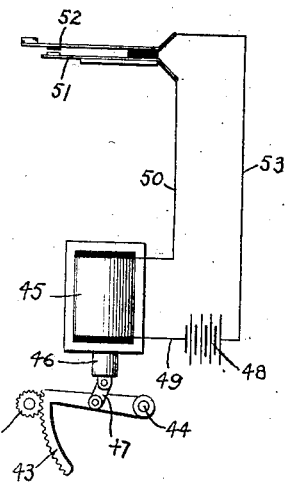
Fig. 6 is a wiring diagram illustrating the mechanism for retaining the indicating hand in a zero position as long as the vehicle is in movement, this being accomplished by the trembler which will retain the armature within the coil thus completing the circuit through the indicator device.

The power spring 20 is preferably wound up by electromagnetically operated mechanism one form of which is illustrated in Fig. 6. This mechanism comprises a coil 45 provided with a reciprocating core 46. The latter is connected to the rack 43 by means of a link 47. The source of electric current is indicated at 48. The electric circuit is completed through the coil 45 by means of the conducting wires 49 and 50, contact members 51 and 52 and wire 53. The contact members 51 and 52 constitute a trembler device as a result of which the circuit, during the movement of the vehicle, will be closed through the coil 45, the armature 46 attracted and the spring 20 rewound through the link 47, rack 43, pinion 42 and arbor 19. It will thus be seen that so long as the vehicle is in motion the spring 20 will be wound up with the minute hand at zero. However, as soon as the vehicle stops the trembler 52 ceases to function with a result that the clock mechanism heretofore described will begin to function to indicate the time that the car has been parked. It will of course be understood that the minute hand 11 is so related to the arbor 19 that the former will be moved to its zero position as the spring is wound up.

The wiring diagram illustrated in Fig. 7 is an alternative of the wiring diagram illustrated in Fig. 6. It is so constructed that the rewinding of the spring 20 and the return of the minute hand to zero position is effected preferably by a centrifugally operated arm 54 conveniently mounted upon and actuated by the movement of the vehicle to which it is attached. It will be understood that so long as the vehicle is in motion the centrifugally operated arm 54 is in the open position, as indicated, with a result that a current is established through the coil 45 from a suitable source 48 by the conducting wires 55, 55', 56, armature 57, and conducting wire 58. When this circuit is established the coil 45 is excited, the armature attracted and the rack member 43 actuated to wind up the spring as before described. When the vehicle is at rest the centrifugally operated arm 54 is no longer operated with a result that the contacts at 59 are closed and a circuit established through wires 55, 60, 61 magnet 62, and wire 58 back to the source of current 48. This excites the magnet 62, attracts the armature 57 and breaks the main circuit at the contact 63. The coil of the magnet 62 is wound with wire of such resistance that there will not be an appreciable drain on the battery by a prolonged storage of the car.

In Figs. 8, 9 and 10, I have illustrated a modified form of the invention in which not only the minute hand 64 but also an hour hand 65 is provided, the accumulator device taking the form of a dial 66. In this modified form the rewinding of the power spring and the return of the hour and minute hands back to normal position are effected manually as distinguished from the automatic rewinding and the automatic return of the mechanism illustrated in Figs. 1 to 7 inclusive. Of course, when the minute hand 64 is rotated backwardly there will be a corresponding movement imparted to the hour hand as in any ordinary clock. In this specific form the accumulator device 66 has movement in one direction only, that is, in a counter-clockwise direction. The mechanism is manually returned to normal position by means of a knurled member 67 on which is pivoted a pawl 68 normally engaging with the ratchet 69. The pawl 68 is pivotally mounted upon a detent 70 secured to the knurled member. The knurled member 67, pawl 68, and detent 70 are movable longitudinally of the shaft 13 as a unit with a view of causing the detent to engage in a perforation 71 of a glass or other transparent cover 72, thus locking at will the mechanism against operation as, for instance, when the vehicle is in motion. The ratchet 69, however, is fixed to the shaft so that when either is acutated it will serve to operate the other. From what has just been stated it will be seen that when the knurled member 67 and pawl 68 are in their outermost position, the knurled member 67 can be actuated in one direction independently of the ratchet 69. The object of this is to so position the detent 70 as to enable it to engage in the perforation 71 after the hour and minute hands have been restored to zero position. The pawl is wide enough to compensate for the longitudinal movement of the knurled member.

Referring now to the clock mechanism the reference numerals 15 and 16 designate the front and back plates of the clock. The reference numeral 19 designates an arbor journaled in the plates 15 and 16. One end of the power spring 20 is connected to the arbor 19 and the other end of said spring is anchored to a stud 21 projecting forwardly from the rear plate 16. Fixed upon the arbor 19 is a gear 22 meshing with a pinion 23 fixed to the shaft 13. Rotatably mounted upon the shaft 13 is a gear 24 constituting a part of the escapement train of gears not shown. The gear 24 is caused to rotate with the shaft 13 by means of a slip ring 73, the object of which is to enable the rewinding of the spring 20 through the shaft 13, pinion 23, and gear 22 without the necessity of operating the escapement gear train. The parts in Figs. 8, 9 and 10 designated by numerals 13, 15, 16, 19, 20, 21, 22, 23 and 24 correspond to the same designated parts in Figs. 1 to 5 inclusive.

Fixed upon the shaft 13 is a pinion 74 which meshes with an idler 75. Fixed concentrically to this idler is a pinion 76 meshing with a gear 77. This gear 77 is rotatably mounted upon the shaft 13 through the sleeve 78, the said sleeve carrying the hour hand 65. The minute hand 64 is fixed to the shaft 13. It will of course be understood that the gear train just described is so constructed and arranged that a movement of the shaft 13 to actuate the minute hand will impart the necessary movement to the hour hand. Also fixed upon the sleeve 78 is a pinion 79 which meshes with a gear 80 rotatably mounted upon the stub shaft 81, a sleeve 82 being employed to maintain the gear 80 a suitable distance from the plate 15 for reasons which are understood. Also mounted upon the stub shaft 81 but having a slight friction therewith is a ratchet 83 having a forwardly projecting sleeve 84 on which the accumulator dial 66 is mounted. The gear 80 carries a pawl 85 which engages with the ratchet 83. From the construction it will be seen that when the gear 80 is actuated by the gear train just described, the pawl 85 in engagement with the ratchet 83 will not only impart a corresponding angular movement to the latter, but also a corresponding angular movement to the accumulator dial 66. The accumulator is preferably equipped with peripheral notches which are adapted to be engaged by a detent or spring 86 whereby a retrograde or clockwise movement of the accumulator is prevented when the hour and minute hands are restored to normal position by the operation of the handle 67. The dial 12$^a$ carries a stop 87 which prevents the hour hand from being moved in counterclockwise direction past the zero position.

It will be seen from the mechanism just described and illustrated in Figs. 8, 9 and 10, that when the knurled handle 67 is moved to the left to withdraw the detent 70 from the perforation 71, the shaft 13 will be released and the mechanism operated through the power spring 20 to indicate within certain limits elapsed time. The mechanism may be locked against movement at any time by causing the detent 70 to be reengaged by the perforation 71. It will be observed however, that the construction and arrangement of the pinion 79, gear 80, and ratchet 83, is such that a movement of the hour hand 65 a distance corresponding to one hour of time will impart a predetermined movement of the accumulator dial 66.

From the above it will be seen that I have devised a simple piece of mechanism admirably adapted to indicate the time that an automobile or other vehicle is parked or in a position of rest. Two embodiments of this invention are illustrated and described herein, but it is to be expressly understood that I do not limit myself thereto as it will be obvious that many changes may be made in points of detail and other embodiments resorted to without necessarily deviating from the true spirit and scope of my invention as defined by the annexed claims.

What I claim and desire to secure by Letters Patent is:

1. A parking clock mounted upon a movable device comprising a graduated dial, a hand adapted to pass over said dial to indicate elapsed time, means to drive said hand, means controlled by the movement of the device upon which said clock is mounted for maintaining the hand at a certain initial position, and the aforesaid means becoming inoperative upon the cessation of movement of said device to enable the drive means to operate the hand.

2. A parking clock comprising an arbor, a power spring for actuating said arbor, an escapement and escapement gear train including a clutch, a shaft to which the escapement gear train is operatively connected by the clutch, means operatively connecting said shaft and arbor, an arm mounted upon said shaft and actuated thereby to indicate elapsed time, and means for restoring the arm to normal position and rewinding the power spring without actuating said escapement mechanism.

3. A parking clock mounted upon a movable device comprising an elapsed time indicating means, an escapement mechanism, and a power spring controlled by said escapement mechanism for actuating said elapsed time indicating means, in combination with means for automatically restoring the indicating means upon movement of the device upon which the clock is mounted to normal position and simultaneously rewinding said power spring.

4. A parking clock comprising a movable device comprising an arbor, a power spring mounted upon said arbor, an escapement and escapement gear train, a shaft to which the escapement gear train is operatively connected, means operatively connecting said shaft and arbor for driving connection in one direction, an arm mounted upon said shaft and actuated thereby to indicate elapsed time, and automatic means controlled by the movement of the device upon which the clock is mounted for restoring the arm to normal position and rewinding the power spring without actuating said escapement mechanism.

5. A parking clock mounted upon a movable device comprising an elapsed time indicating means, an escapement mechanism, and a power spring controlled by said escapement mechanism for actuating said elapsed time indicating means, in combination with automatic means controlled by the movement of the device for restoring the indicating means to normal position and simultaneously rewinding said power spring without actuating said escapement mechanism.

6. An indicator mounted upon a movable device comprising an elapsed time indicating means, escapement mechanism for said indicating means, power means controlled by escapement mechanism for actuating said indicating means, means controlled by movement of the device for restoring said indicating and power means simultaneously and automatically to normal position, and means for enabling the escapement mechanism to remain unaffected upon the restoration of said indicating and power means to normal position.

7. A parking clock mounted upon a movable device comprising an elapsed time indicating means, an elapsed time accumulator and means automatically controlled by the vibration of the device on which said clock is mounted to render the indicating means inoperative and for rendering said indicating means operative upon the cessation of vibration of said device.

8. A parking clock comprising an arbor, a power spring mounted upon said arbor, an escapement and escapement gear train including a clutch, a shaft to which the escapement gear train is operatively connected by the clutch, means operatively connecting said shaft and arbor, an arm mounted upon said shaft and actuated thereby to indicate elapsed time, an elapsed time accumulator, and automatic means for restoring the arm to normal position and the power spring to be rewound without actuating said escapement mechanism.

9. A parking clock mounted upon a movable device comprising an elapsed time indicating means, an escapement mechanism, a power means controlled by said escapement mechanism for actuating said elapsed time indicating means, an elapsed time accumulator actuated by said power means, in combination with means automatically controlled by the movement of the device for simultaneously restoring the indicating and power means to normal position.

10. A parking clock mounted upon a movable device comprising an elapsed time indicating means, an escapement mechanism, a power spring controlled by said escapement mechanism for actuating said elapsed time indicating means, and an elapsed time accumulator actuated by said power spring, in combination with means automatically controlled by the movement of the device for enabling the indicating means to be restored to normal position and simultaneously rewinding said power spring without actuating said escapement mechanism.

11. An indicator mounted upon a movable device comprising an elapsed time indicating means, escapement mechanism, power means controlled by said escapement mechanism for actuating said indicating means, and automatic means controlled by the movement of the device enabling said indicating and power means to be simultaneously restored to normal position.

12. An indicator mounted upon a movable device comprising an elapsed time indicating means, escapement mechanism, power means controlled by said escapement mechanism for actuating said indicating means, and means controlled by the movement of the device for automatically restoring said indicating and power means simultaneously to normal position, in combination with an elapsed time accumulator also actuated by said power means.

13. A parking clock or similar device comprising an elapsed time indicating means, power means for normally actuating said indicating means to indicate elapsed time, and means controlled by the vibration of the clock for restoring and maintaining said indicating means at a certain predetermined initial position.

14. A parking clock including an elapsed time indicating means having a predetermined initial position, escapement mechanism for controlling said means, and a power spring for operating said escapement mechanism, in combination with means for automatically rendering said clock operative to indicate elapsed time, said last named means automatically restoring said indicating means to its initial position and rewinding the power spring.

15. A parking clock comprising an escapement device, an elapsed time indicating means normally actuated by said escapement device, and means controlled by the vibration of the clock for restoring the indicating means to a predetermined initial position.

16. A parking clock comprising clock mechanism including an escapement device, an indicating means actuated by said escapement device, and means controlled by the vibration of the clock for restoring and maintaining the indicating means at a predetermined position but adapted to automatically render the indicating means operative when the clock is at rest.

17. A parking clock mounted upon a movable device comprising an elapsed time indicating means having a predetermined initial position, in combination with means controlled by the stopping of the movable device for automatically rendering the aforesaid means operative to indicate elapsed time, and controlled by the movement of the movable device for automatically restoring said indicating means to its initial position.

In testimony whereof, I have hereunto set my hand this 20th day of December, 1923.

BENJAMIN F. HUTCHES, Jr.